United States Patent
Fan

(10) Patent No.: US 11,016,323 B2
(45) Date of Patent: May 25, 2021

(54) FRONT BEZEL ASSEMBLY STRUCTURE FOR DISPLAY APPARATUS, AND DISPLAY APPARATUS

(71) Applicants: K-TRONICS (SUZHOU) TECHNOLOGY CO., LTD., Jiangsu (CN); BOE TECHNOLOGY GROUP CO., LTD., Beijing (CN)

(72) Inventor: Mingshuai Fan, Beijing (CN)

(73) Assignees: K-TRONICS (SUZHOU) TECHNOLOGY CO., LTD., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/646,885

(22) PCT Filed: Apr. 2, 2019

(86) PCT No.: PCT/CN2019/081053
§ 371 (c)(1),
(2) Date: Mar. 12, 2020

(87) PCT Pub. No.: WO2019/192487
PCT Pub. Date: Oct. 10, 2019

(65) Prior Publication Data
US 2021/0011326 A1    Jan. 14, 2021

(30) Foreign Application Priority Data

Apr. 4, 2018   (CN) .......................... 201820477287.0

(51) Int. Cl.
*G02F 1/1333*    (2006.01)

(52) U.S. Cl.
CPC .. *G02F 1/133328* (2021.01); *G02F 1/133308* (2013.01); *G02F 1/13332* (2021.01)

(58) Field of Classification Search
None
See application file for complete search history.

(56) References Cited

U.S. PATENT DOCUMENTS

| | | | |
|---|---|---|---|
| 7,492,421 B1* | 2/2009 | Kim ................. | G02F 1/133308 349/58 |
| 2015/0015793 A1* | 1/2015 | Noguchi ............. | H05K 5/0017 348/725 |
| 2015/0208523 A1* | 7/2015 | Lee .......................... | H05K 5/03 361/679.01 |

FOREIGN PATENT DOCUMENTS

| | | |
|---|---|---|
| CN | 2727785 Y | 9/2005 |
| CN | 106371238 A | 2/2017 |
| CN | 106652797 A | 5/2017 |
| CN | 206684422 U | 11/2017 |
| CN | 206805046 U | 12/2017 |

(Continued)

*Primary Examiner* — Phu Vu

(57) ABSTRACT

A front frame assembly structure for a display device and a display device are disclosed. The front frame assembly structure for the display device includes a front frame and a backplane, the front frame includes four sub-front frames, the four sub-front frames are a first sub-front frame, a second sub-front frame, and two third sub-front frames, respectively, an edge of the backplane can be clamped into a groove of the first sub-front frame and grooves of the two sub-front frames; the second sub-front frame is connected with the backplane; and adjacent two of the sub-front frames are engaged with each other through a first clamping structure.

18 Claims, 5 Drawing Sheets

(56) References Cited

FOREIGN PATENT DOCUMENTS

CN 208283685 U 12/2018

\* cited by examiner

FRONT BEZEL ASSEMBLY STRUCTURE FOR DISPLAY APPARATUS, AND DISPLAY APPARATUS

The present application claims priority of Chinese Patent Application No. 201820477287.0 filed on Apr. 4, 2018, the disclosure of which is incorporated herein by reference in its entirety as part of the present application.

TECHNICAL FIELD

Embodiments of the present disclosure relate to a front frame assembly structure for a display device and a display device.

BACKGROUND

With development of electronic technology, display devices such as liquid crystal televisions, mobile phones, and computer monitors have been widely used in life and work. A display device (e.g., a liquid crystal television) generally includes components such as a front frame (a front case), a backplane, a rear case, and so on; when assembled, the front frame is fixed on the backplane, and then the rear case is fixed on the backplane. The front frame is an important structural component for the display device, and whether structural design thereof is reasonable directly affects an assembly process of the display device.

SUMMARY

At least one embodiment of the present disclosure provides a front frame assembly structure for a display device, which comprises a front frame and a backplane, the front frame comprises four sub-front frames, the four sub-front frames are: a first sub-front frame and a second sub-front frame that are arranged along a first direction, and two third sub-front frames arranged along a second direction, respectively, and the second direction is perpendicular to the first direction, the first sub-front frame and the two third sub-front frames each have a groove; an edge of the backplane is capable of being clamped into the groove of the first sub-front frame and the grooves of the two sub-front frames; the second sub-front frame is connected with the backplane; adjacent two of the sub-front frames are engaged with each other through a first clamping structure, and the first clamping structure is configured to limit relative movement between the adjacent two of the sub-front frames at least in the second direction.

For example, in the front frame assembly structure for the display device provided by at least one embodiment of the present disclosure, the first sub-front frame and the backplane are engaged with each other through a second clamping structure; and the second clamping structure is configured to limit relative movement between the first sub-front frame and the backplane at least in the first direction.

For example, in the front frame assembly structure for the display device provided by at least one embodiment of the present disclosure, both ends of the third sub-front frame respectively abut against the first sub-front frame and the second sub-front frame, so as to limit movement of the third sub-front frame relative to the first sub-front frame and the second sub-front frame in the first direction.

For example, in the front frame assembly structure for the display device provided by at least one embodiment of the present disclosure, the first clamping structure comprises a first clamping claw provided on one of the adjacent two of the sub-front frames, and a first clamp notch provided on the other of the adjacent two of the sub-front frames, and the first clamping claw is capable of extending into the first clamp notch.

For example, in the front frame assembly structure for the display device provided by at least one embodiment of the present disclosure, notch walls on both sides of the first clamp notch that are arranged along the second direction both abut against the first clamping claw.

For example, in the front frame assembly structure for the display device provided by at least one embodiment of the present disclosure, with respect to the first clamping structure connected with the first sub-front frame and the third sub-front frame, the first clamping claw is provided on a rear wall of one of the adjacent two of the sub-front frames, and the first clamp notch is provided on a rear wall of the other of the adjacent two of the sub-front frames; a rear wall of the sub-front frame is farther away from a display side of the display device than a front wall of the sub-front frame.

For example, in the front frame assembly structure for the display device provided by at least one embodiment of the present disclosure, the second clamping structure comprises a first limit protrusion provided on the backplane and a first limit notch provided on the first sub-front frame, or the second clamping structure comprises a first limit notch provided on the backplane and a first limit protrusion provided on the first sub-front frame; and in a case where the edge of the backplane is clamped into the groove of the first sub-front frame, the first limit protrusion extends into the first limit notch.

For example, in the front frame assembly structure for the display device provided by at least one embodiment of the present disclosure, notch walls on both sides of the first limit notch that are arranged along the first direction both abut against the first limit protrusion.

For example, in the front frame assembly structure for the display device provided by at least one embodiment of the present disclosure, the first limit protrusion is provided on a rear side surface of the backplane, and the first limit notch is provided on a rear wall of the first sub-front frame, or the first limit protrusion is provided on the rear wall of the first sub-front frame, and the first limit notch is provided on the rear side surface of the backplane; and the rear wall of the first sub-front frame is farther away from a display side of the display device than a front wall of the first sub-front frame, and the rear side surface of the backplane is farther away from the display side of the display device than a front side surface of the backplane.

For example, in the front frame assembly structure for the display device provided by at least one embodiment of the present disclosure, the first limit notch comprises a first limit slot section and a first guide slot section; the first limit slot section extends along the second direction; a first end of the first guide slot section is connected with one end of the first limit slot section; in a case where the first limit notch is provided on the rear wall of the first sub-front frame, a second end of the first guide slot section extends to a first edge of the rear wall of the first sub-front frame, and the first edge is an edge on one side of the rear wall of the first sub-front frame that is close to a groove opening of the groove of the first sub-front frame; and in a case where the first limit notch is provided on the rear side surface of the backplane, the second end of the first guide slot section extends to an edge of the rear side surface of the backplane.

For example, in the front frame assembly structure for the display device provided by at least one embodiment of the present disclosure, the backplane and a middle portion of the third sub-flour frame are engaged with each other through a third clamping structure, and the third clamping structure is configured to limit relative movement between the middle portion of the third sub-front frame and the backplane in the second direction.

For example, in the front frame assembly structure for the display device provided by at least one embodiment of the present disclosure, the third clamping structure comprises a second limit protrusion provided on the backplane and a second limit notch provided on the third sub-front frame, or the third clamping structure comprises a second limit notch provided on the backplane and a second limit protrusion provided on the third sub-front frame; and in a case where the edge of the backplane is clamped into the groove of the third sub-front frame, the second limit protrusion extends into the second limit notch.

For example, in the front frame assembly structure for the display device provided by at least one embodiment of the present disclosure, notch walls on both sides of the second limit notch that are arranged along the second direction both abut against the second limit protrusion.

For example, in the front frame assembly structure for the display device provided by at least one embodiment of the present disclosure, the second limit protrusion is provided on the rear side surface of the backplane, and the second limit notch is provided on a rear wall of the third sub-front frame, or the second limit protrusion is provided on the rear wall of the third sub-front frame, and the second limit notch is provided on the rear side surface of the backplane; and the rear wall of the third sub-front frame is farther away from the display side of the display device than a front wall of the third sub-front frame, and the rear side surface of the backplane is farther away from the display side of the display device than a front side surface of the backplane.

For example, in the front frame assembly structure for the display device provided by at least one embodiment of the present disclosure, the second limit notch comprises a second limit slot section and a second guide slot section, and the second limit slot section extends along the first direction; in a case where the second limit notch is provided on the rear wall of the third sub-front frame, a first end of the second guide slot section is connected with an end of the second limit slot section that is close to the first sub-front frame; a second end of the second guide slot section extends to a second edge of the rear wall of the third sub-front frame; and the second edge is an edge on one side of the rear wall of the third sub-front frame that is close to the groove opening of the groove of the third sub-front frame; and in a case where the second limit notch is provided on the rear side surface of the backplane, the first end of the second guide slot section is connected with the end of the second limit slot section that is close to the first sub-front frame, and the second end of the second guide slot section extends to the edge of the rear side surface of the backplane.

For example, in the front frame assembly structure for the display device provided by at least one embodiment of the present disclosure, the backplane and the middle portion of the third sub-front frame are engaged with each other through a plurality of third clamping structures.

For example, in the front frame assembly structure for the display device provided by at least one embodiment of the present disclosure, the second front frame comprises a mounting plate, and the mounting plate is fixedly connected with a side surface of the backplane that is perpendicular to the first direction.

For example, in the front frame assembly structure for the display device provided by at least one embodiment of the present disclosure, the mounting plate is fixedly connected with the side surface of the backplane that is perpendicular to the first direction by a threaded fastener.

At least one embodiment of the present disclosure provides a display device, which comprises any one of the above front frame assembly structures for the display device.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
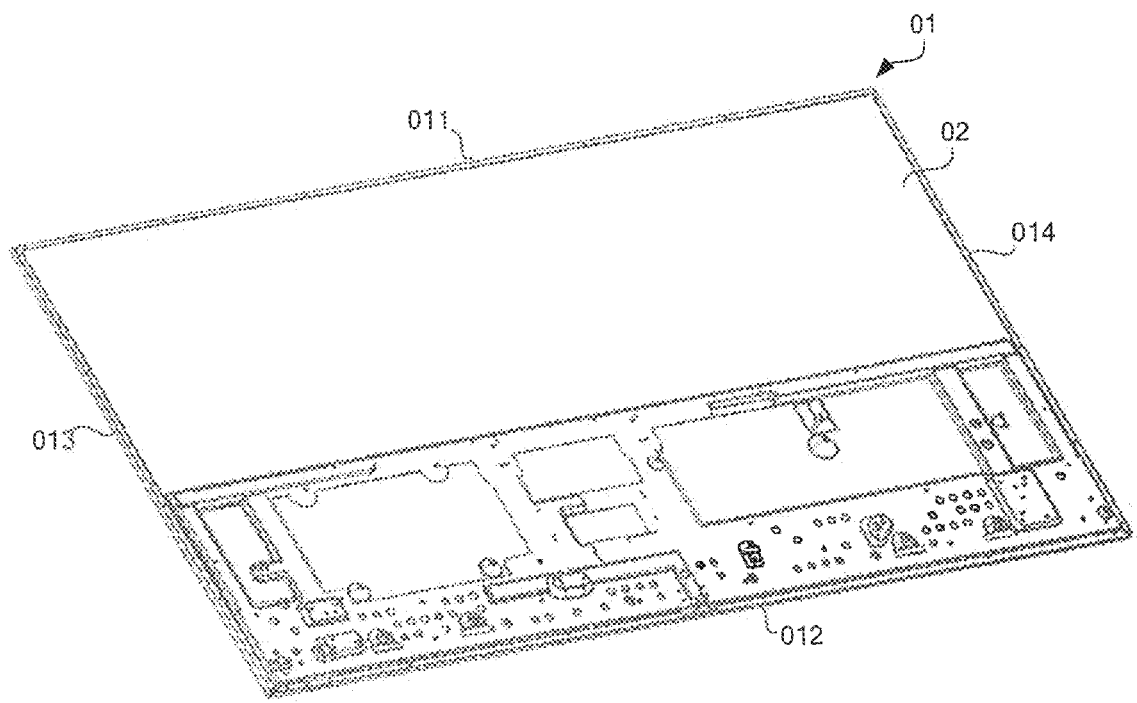
FIG. 1 is a schematic diagram of a front frame assembly structure for a display device.
Figure 2:
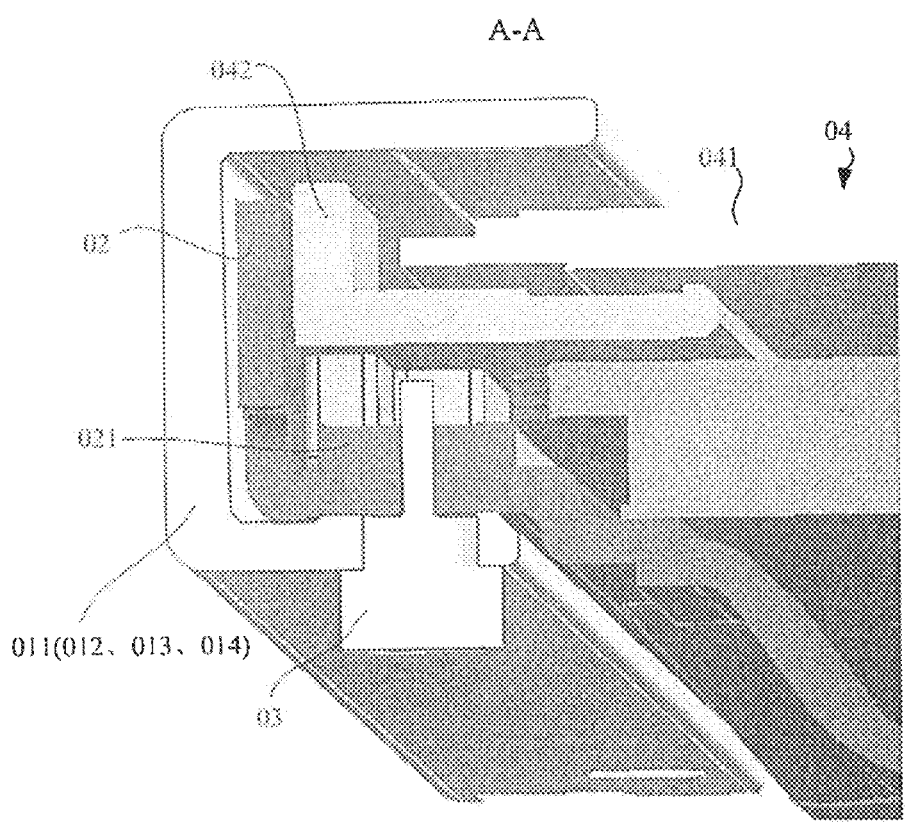
FIG. 2 is a cross-sectional view of a front frame and a backplane for a display device that are connected by screws.

FIG. 1 shows a display device. As shown in FIG. 1, the display device comprises a front frame 01 and a backplane 02, the front frame 01 comprises an upper front frame 011, a lower front frame 012, a left front frame 013 and a right front frame 014. FIG. 2 shows a situation of connection between the front frame and the backplane in the display device. As shown in FIG. 2, the upper front frame 011, the lower front frame 012, the left front frame 013 and the right front frame 014 are all connected with an edge of the backplane 02, and rear walls of the upper front frame 011, the lower front frame 012, the left front frame 013 and the right front frame 014 are all fixedly connected with the backplane 02 by screws 03.

In the above-described display device, as shown in FIG. 2, because the upper front frame 011, the lower front frame 012, the left front frame 013 and the right front frame 014 are all fixed to the backplane 02 by screws 03, during assembling, it is necessary for an operator to tighten all the screws 03 between the upper front frame 011, the lower front frame 012, the left front frame 013, the right front frame 014 and the backplane 02 to complete assembly between the front frame 01 and the backplane 02, which not only wastes a lot of time so as to reduce assembly efficiency for the display device, but also wastes a lot of labor costs, which is not favorable for reducing total costs for the display device. In addition, in order to implement connections of the backplane 02 with the upper front frame 011, the lower front frame 012, the left front frame 013 and the right front frame 014 by the screws 03, a surface of the backplane 02 needs to be provided with threaded columns 021 extending inside the backplane 02 to cooperate with the screws 03; however, the threaded column 021 needs to occupy certain space inside the backplane 02, and will also squeeze space for arranging optical components 04 inside the backplane 02 (e.g., the threaded column 021 will squeeze space of a plastic frame 042 used to carry liquid crystal glass 041), thereby affecting optimal arrangements of internal components of the backplane 02.

At least one embodiment of the present disclosure provides a front frame assembly structure for a display device and a display device, which may improve assembly efficiency for the display device when assembling a front frame and a backplane and save labor costs.

Figure 3:
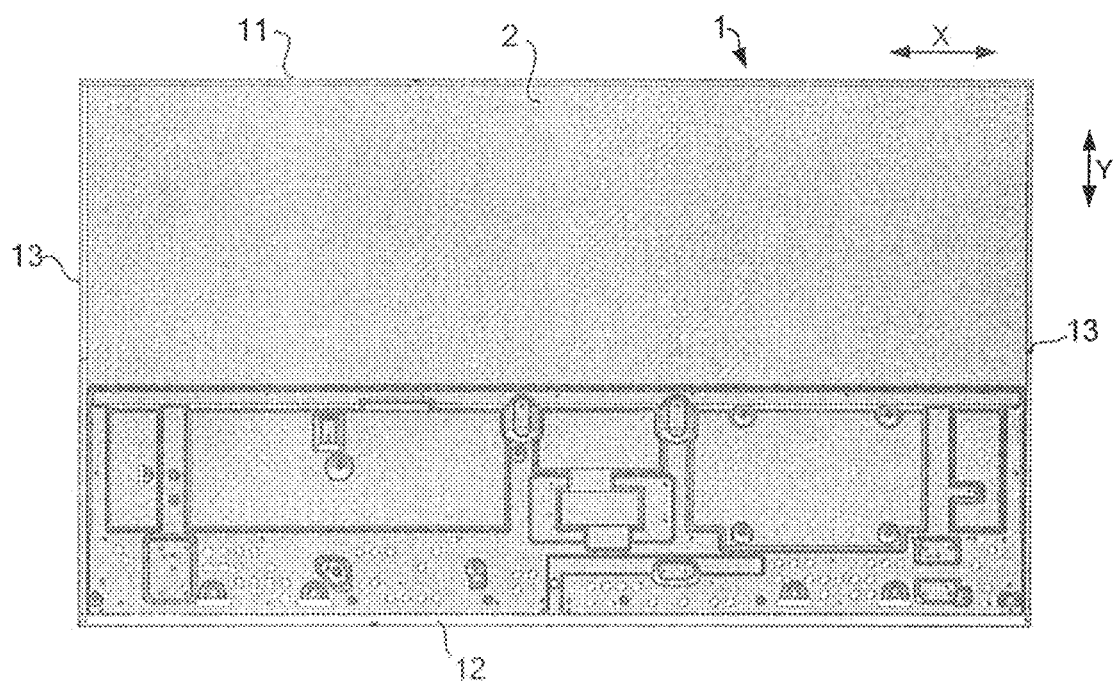
FIG. 3 is a front view of a front frame and a backplane provided by at least one embodiment of the present disclosure after assembling.
Figure 4:
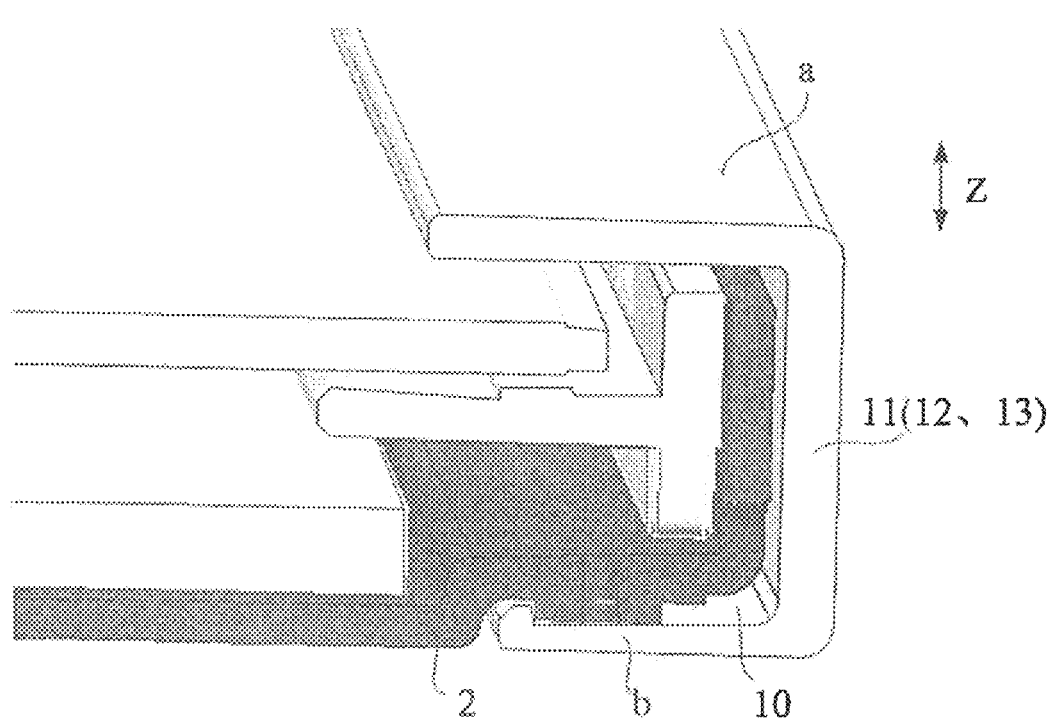
FIG. 4 is a cross-sectional view of a front frame and a backplane for a display device provided by at least one embodiment of the present disclosure that are engaged with each other.
Figure 5:
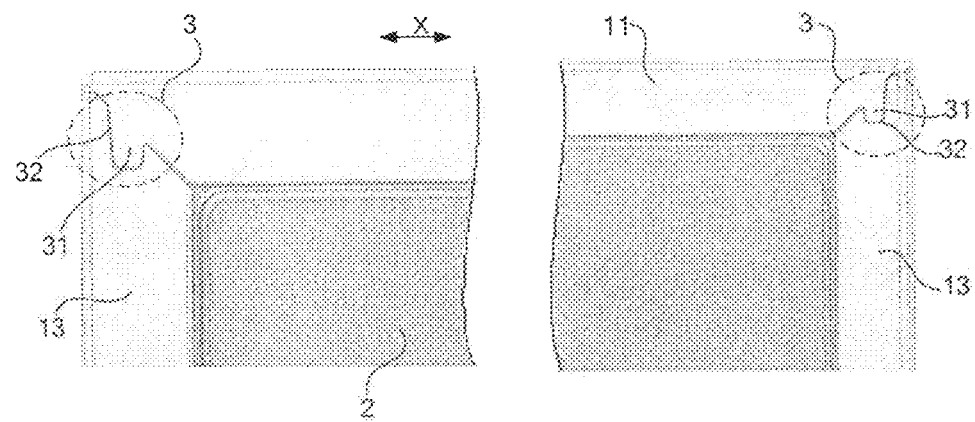
FIG. 5 is a schematic diagram of a first sub-front frame and a third sub-front frame provided by at least one embodiment of the present disclosure that are engaged with each other.
Figure 6:
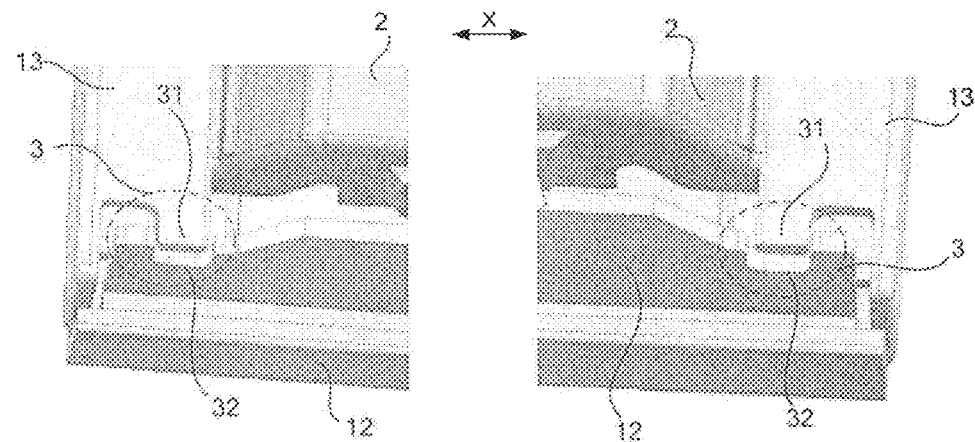
FIG. 6 is a schematic diagram of a second sub-front frame and a third sub-front frame provided by at least one embodiment of the present disclosure that are engaged with each other.

For example, FIG. 3 shows a front frame assembly structure for a display device provided by an embodiment of the present disclosure; and as shown in FIG. 3, the front frame assembly structure for the display device comprises a front frame 1 and a backplane 2, the front frame 1 comprises four sub-front frames, the four sub-front frames are respectively a first sub-front frame 11 and a second sub-front frame 12 arranged along a first direction (e.g., a Y direction shown in the diagram), and two third sub-front frames 13 arranged along a second direction (e.g., an X direction shown in the diagram), and the second direction is perpendicular to the first direction. As shown in FIG. 4, the first sub-front frame 11 and the two third sub-front frames 13 each have a groove 10; and an edge of the backplane 2 can be clamped into the groove 10 of the first sub-front frame 11 and the grooves 10 of the two sub-front frames 13. The second sub-front frame 12 is connected, for example, fixedly connected with the backplane 2. As shown in FIG. 5 and FIG. 6, adjacent two of the sub-front frames are engaged with each other through a first clamping structure 3, for example, the first clamping structure 3 is configured to limit relative movement between the two adjacent sub-front frames at least in the second direction.

Figure 7:
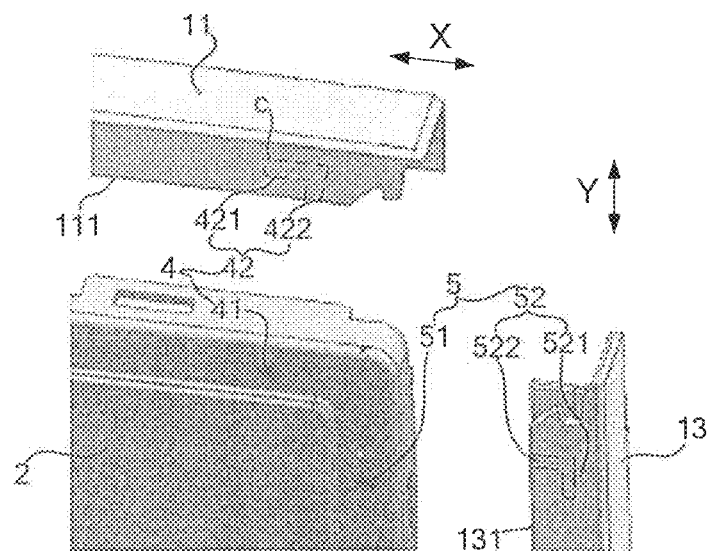
FIG. 7 is an exploded view of a second sub-front frame, a backplane and a third sub-front frame provided by at least one embodiment of the present disclosure.

For example, as shown in FIG. 7, the first sub-front frame 11 and the backplane 2 are engaged with each other through a second clamping structure 4; and the second clamping structure 4 is configured to limit relative movement between the first sub-front frame 11 and the backplane 2 at least in the first direction.

For example, as shown in FIG. 3, both ends of each third sub-front frame 13 respectively abut against the first sub-front frame 11 and the second sub-front frame 12, so as to limit movement of the third sub-front frame 13 relative to the first sub-front frame 11 and the second sub-front frame 12 in the first direction.

In the above-described front frame assembly structure for the display device, as shown in FIG. 4, because the edge of the backplane 2 is clamped into the groove 10 of the first sub-front frame 11 and the grooves 10 of the two third sub-front frames 13, positions of the first sub-front frame 11 and the two third sub-front frames 13 are limited in a thickness direction of the backplane 2 (e.g., a Z direction shown in FIG. 4). As shown in FIG. 3, because the second sub-front frame 12 is fixedly connected with the backplane 2, a position of the second sub-front frame 12 is limited in three directions, that is, the thickness direction of the backplane 2, the first direction, and the second direction. As shown in FIG. 5 and FIG. 6, because two adjacent sub-front frames are engaged with each other through the first clamping structure 3, the first clamping structure 3 can limit relative movement between the two adjacent sub-front frames in the second direction; and the second sub-front frame 12 has been fixed to the backplane 2, so that the two third sub-front frames 13 adjacent to the second sub-front frame 12 are relatively fixed to the backplane 2 in the second direction, that is, positions of the two third sub-front frames 13 are limited in the second direction, then a position of the first sub-front frame 11 adjacent to the two third sub-front frames 13 is also limited in the second direction. As shown in FIG. 7, because the second clamping structure 4 is provided between the first sub-front frame 11 and the backplane 2, the second clamping structure 4 can limit relative movement between the first sub-front frame 11 and the backplane 2 in the first direction, so that the second clamping structure 4 can limit a position of the first sub-front frame 11 in the first direction. As shown in FIG. 3, because both ends of each third sub-front frame 13 respectively abut against the first sub-front frame 11 and the second sub-front frame 12 to limit movement of the third sub-front frame 13 relative to the first sub-front frame 11 or the second sub-front frame 12 in the first direction, positions of the two third sub-front frames are limited in the first direction by means that both ends of the third sub-front frame 13 respectively abut against the first sub-front frame 11 and the second sub-front frame 12. Therefore, through the above structural design, positions of the four sub-front frames are limited in three directions, that is, the thickness direction of the backplane 2, the first direction, and the second direction, so that the four sub-front frames and the backplane 2 are firmly connected together.

In the front frame assembly structure for the display device provided by the embodiments of the present disclosure, the first sub-front frame 11 and the two third sub-front frames 13 are relatively fixed to the backplane 2 by clamping or abutting, in this way, during assembling, the first sub-front frame 11 and the two third sub-front frames 13 are connected with the backplane 2 without any screw, and the assembly may be completed directly by simple clamping or abutting, so that an operator does not have to tighten the screws one by one, thereby saving a lot of time and labor for assembly, which is favorable for improving assembly efficiency and reducing labor costs. In addition, because the first sub-front frame 11 and the two third sub-front frames 13 are connected with the backplane 2 without any screw, it is not necessary to provide any threaded column inside the backplane 2, which can greatly reduce occupation of internal space of the backplane 2, and can facilitate optimal arrangements of internal components of the backplane 2. Meanwhile, because the first sub-front frame 11 and the two third sub-front frames 13 are connected with the backplane 2 without any screw, apparent aesthetic sense of the display device is also increased.

In the above-described embodiment, the first clamping structure 3 is not unique, and may be various types of clamping structures. For example, as shown in FIG. 5, between the first sub-front frame 11 and the third sub-front frame 13, the first clamping structure 3 includes a first clamping claw 31 provided on the first sub-front frame 11, and a first clamp notch 32 provided on the third sub-front frame 13; the first clamping claw 31 can extend into the first clamp notch 32, and notch walls on both sides of the first clamp notch 32 along the second direction both abut against the first clamping claw 31. Because the notch walls on both sides of the first clamp notch 32 along the second direction both abut against the first clamping claw 31, relative movement between the first sub-front frame 11 and the third sub-front frame 13 in the second direction can be limited.

For example, as shown in FIG. 6, between the second sub-front frame 12 and the third sub-front frame 13, the first clamping structure 3 includes a first clamping claw 31 provided on the third sub-front frame 13, and a first clamp notch 32 provided on the second sub-front frame 12; the first clamping claw 31 can extend into the first clamp notch 32, and notch walls on both sides of the first clamp notch 32 along the second direction both abut against the first clamping claw 31. Because the notch walls on both sides of the first clamp notch 32 along the second direction both abut against the first clamping claw 31, relative movement between the second sub-front frame 12 and the third sub-front frame 13 in the second direction can be limited.

For example, in the embodiment shown in FIG. 5, positions of the first clamping claw 31 and the first clamp notch 32 may also be exchanged, that is, the first clamping claw 31 is provided on the third sub-front frame 13, and the first clamp notch 32 is provided on the first sub-front frame 11, so that the effect of limiting relative movement between the first sub-front frame 11 and the third sub-front frame 13 in the second direction can also be achieved. For example, in the embodiment shown in FIG. 6, the positions of the first clamping claw 31 and the first clamp notch 32 may also be exchanged, that is, the first clamping claw 31 is provided on the second sub-front frame 12, and the first clamp notch 32 is provided on the third sub-front frame 13, so that the effect of limiting relative movement between the second sub-front frame 12 and the third sub-front frame 13 in the second direction can also be achieved.

For example, between the first sub-front frame 11 and the third sub-front frame 13, positions for arranging the first clamping claw 31 and the first clamp notch 32 are not unique. For example, the first clamping claw 31 may be provided on a rear wall of one of the first sub-front frame 11 and the third sub-front frame 13, and the first clamp notch 32 is opened on a rear wall of the other of the first sub-front frame 11 and the third sub-front frame 13. For example, as shown in FIG. 5, the first clamping claw 31 is provided on the rear wall of the first sub-front frame 11, and the first clamp notch 32 may be opened on the rear wall of the third sub-front frame 13. In addition, the first clamping claw 31 may also be provided on a front wall of one of the first sub-front frame 11 and the third sub-front frame 13, and the first clamp notch 32 may also be opened on a front wall of the other of the first sub-front frame 11 and the third sub-front frame 13. As compared with the case where the first clamping claw 31 and the first clamp notch 32 are provided on the front walls, in the case where the first clamping claw 31 and the first clamp notch 32 are provided on the rear walls, there is no clamping gap on a watching side of the display device, that is, a display side of the display device, so that appearance of the display device is more beautiful.

It should be noted that: the front wall of the first sub-front frame 11 refers to a side wall of the first sub-front frame 11 that is located on a front side of the backplane 2, for example, a side wall a as shown in FIG. 4, in a case where the edge of the backplane 2 is clamped into the groove 10 of the first sub-front frame 11. The rear wall of the first sub-front frame 11 refers to a side wall of the first sub-front frame 11 that is located on a rear side of the backplane 2, for example, a side wall b as shown in FIG. 4, in the case where the edge of the backplane 2 is clamped into the groove 10 of the first sub-front frame 11. The front wall of the third sub-front frame 13 refers to a side wall of the third sub-front frame 13 that is located on the front side of the backplane 2, for example, the side wall a as shown in FIG. 4, in a case where the edge of the backplane 2 is clamped into the groove 10 of the third sub-front frame 13. The rear wall of the third sub-front frame 13 refers to a side wall of the third sub-front frame 13 that is located on the rear side of the backplane 2, for example, the side wall b as shown in FIG. 4, in the case where the edge of the backplane 2 is clamped into the groove 10 of the third sub-front frame 13. The front side of the backplane 2 refers to a side of the backplane 2 that is close to a display side of the display device that display images; and the rear side of the backplane 2 refers to a side of the backplane 2 that is away from the display side of the display device.

For example, between the second sub-front frame 12 and the third sub-front frame 13, positions for arranging the first clamping claw 31 and the first clamp notch 32 are not unique. For example, as shown in FIG. 6, the first clamping claw 31 may be provided on the rear wall of the first sub-front frame 11, and the first clamp notch 32 is opened in a position on the second sub-front frame 12 where it may be engaged with the first clamping claw 31. Alternatively, the first clamping claw 31 may also be provided on the front wall of the first sub-front frame 11, and the first clamp notch 32 is opened in a position on the second sub-front frame 12 where it may be engaged with the first clamping claw 31. As compared with the case where the first clamping claw 31 is provided on the front wall of the first sub-front frame 11, in the case where the first clamping claw 31 is provided on the rear wall of the first sub-front frame 11, there is no clamping gap on a watching side of the display device, that is, the display side of the display device, so that the appearance of the display device is more beautiful.

For example, in other examples, the first clamping structure 3 may also be designed to limit relative movement between two adjacent sub-front frames in the first direction, while limiting relative movement between the two adjacent sub-front frames in the second direction. For example, shapes of the first clamping claw 31 and the first clamp notch 32 are designed, for example, a hook structure is added to an end portion of the first clamping claw 31, and a cavity for accommodating the hook is accordingly opened in the first clamp notch 32, so that relative movement between the two adjacent sub-front frames in the first direction can also be limited through cooperation of the first clamping claw 31 and the first clamp notch 32. A specific form of the first clamping structure 3 is not limited in the embodiments of the present disclosure.

For example, the second clamping structure 4 is not unique, and may be various types of clamping structures. For example, as shown in FIG. 7, the second clamping structure 4 includes a first limit protrusion 41 provided on the backplane 2, for example, on a rear side surface of the backplane 2, and includes a first limit notch 42 opened on the first sub-front frame 11, for example, on the rear wall of the first sub-front frame 11. In the case where the edge of the backplane 2 is clamped into the groove 10 of the first sub-front frame 11, the first limit protrusion 41 extends into the first limit notch 42, and notch walls on both sides of the first limit notch 42 along the first direction both abut against the first limit protrusion 41. Because the notch walls on both sides of the first limit notch 42 along the first direction both abut against the first limit protrusion 41, relative movement between the first sub-front frame 11 and the backplane 2 in the first direction can be limited, that is, the position of the first sub-front frame 11 in the first direction is limited.

Of course, positions of the first limit protrusion 41 and the first limit notch 42 may also be exchanged, that is, the first limit notch 42 is opened on the backplane 2, for example, on the rear side surface of the backplane 2; and the first limit protrusion 41 is provided on the first sub-front frame 11, for example, on the rear wall of the first sub-front frame 11. In the case where the edge of the backplane 2 is clamped into the groove 10 of the first sub-front frame 11, the first limit protrusion 41 extends into the first limit notch 42, and notch walls on both sides of the first limit notch 42 along the first direction both abut against the first limit protrusion 41. In this way, the effect of limiting relative movement between the first sub-front frame 11 and the backplane 2 in the first direction can also be achieved.

Figure 8:
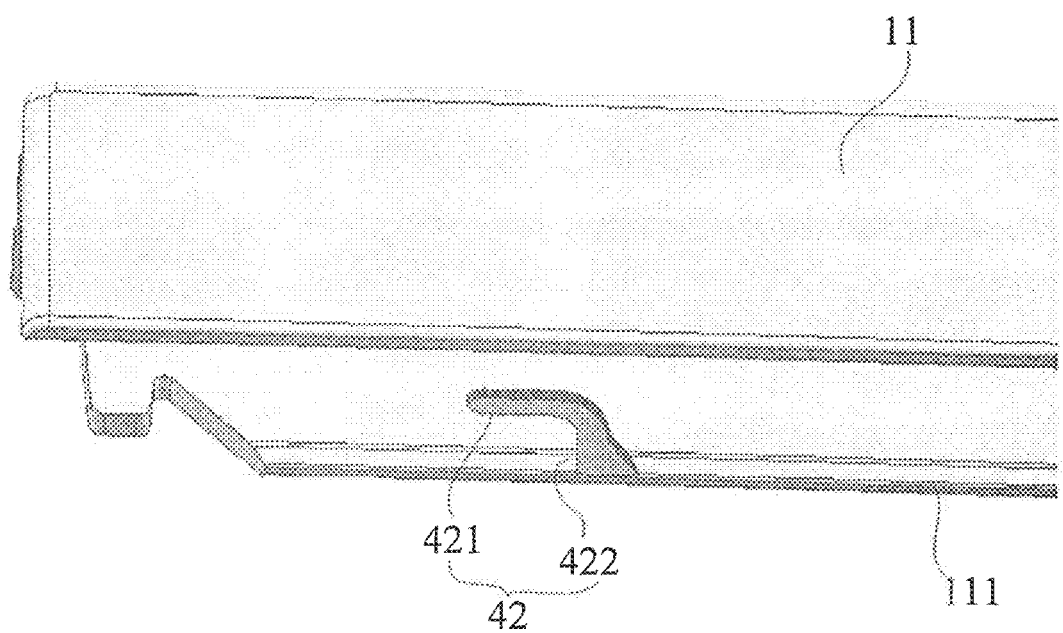
FIG. 8 is a structural view of a first sub-front frame provided by at least one embodiment of the present disclosure.

For example, in an embodiment in which the first limit notch 42 is opened on the rear wall of the first sub-front frame 11 and the first limit protrusion 41 is provided on the rear side surface of the backplane 2, in order to conveniently implement engagement between the first limit protrusion 41 and the first limit notch 42 in the process of clamping the edge of the backplane 2 into the groove 10 of the first sub-front frame 11, as shown in FIG. 7 and FIG. 8, the first limit notch 42 includes a first limit slot section 421 and a first guide slot section 422; the first limit slot section 421 extends along the second direction; a first end of the first guide slot section 422 is connected with an end of the first limit slot section 421; a second end of the first guide slot section 422 extends to a first edge 111 of the rear wall of the first sub-front frame 11, and the first edge 111 is an edge on one side of the rear wall of the first sub-front frame 11 that is close to a groove opening of the groove 10 of the first sub-front frame 11. Because the second end of the first guide slot section 422 extends to the first edge 111 of the rear wall of the first sub-front frame 11, in the process of clamping the edge of the backplane 2 into the groove 10 of the first sub-front frame 11, the first limit protrusion 41 provided on the rear side surface of the backplane 2 can slide into the first limit slot section 421 along the first guide slot section 422 at the first edge 111 of the rear wall of the first sub-front frame 11, and then the first sub-front frame 11 is pushed along the second direction, so that the first limit protrusion 41 abuts against the other end of the first limit slot section 421 (e.g., a c-end in FIG. 7), to finally limit the position of the first sub-front frame 11 in the first direction. Thus, by providing the first limit slot section 421 and the first guide slot section 422, interference between the first limit protrusion 41 and the edge of the backplane 2 can be avoided during the assembly process of the first sub-front frame 11 and the backplane 2, so that the assembly of the first sub-front frame 11 and the backplane 2 is more convenient and smooth.

For example, in an embodiment in which the first limit notch 42 is opened on the rear side surface of the backplane 2, and the first limit protrusion 41 is provided on the rear wall of the first sub-front frame 11, in order to conveniently implement engagement between the first limit protrusion 41 and the first limit notch 42 in the process of clamping the edge of the backplane 2 into the groove 10 of the first sub-front frame 11, the first limit notch 42 includes a first limit slot section 421 and a first guide slot section 422; the first limit slot section 421 extends alone the second direction; a first end of the first guide slot section 422 is connected with an end of the first limit slot section 421; and a second end of the first guide slot section 422 extends to the edge of the rear side surface of the backplane 2. In this embodiment, beneficial effects obtained by providing the first limit slot section 421 and the first guide slot section 422 are the same as those in the embodiment in which the first limit notch 42 is opened on the rear wall of the first sub-front frame 11, and no details will be repeated here.

For example, in other examples, the second clamping structure 4 may also be designed to limit relative movement between the first sub-front frame 11 and the backplane 2 in the second direction, while limiting relative movement between the first sub-front frame 11 and the backplane 2 in the first direction. For example, shapes of the first limit protrusion 41 and the first limit slot section 421 may be designed, for example, a hook structure is added to an end portion of the first limit protrusion 41, and a cavity for accommodating the hook is accordingly opened in the first limit slot section 421, so that relative movement between the first sub-front frame 11 and the backplane 2 in the second direction can also be limited through cooperation of the first limit protrusion 41 and the first limit slot section 421. A specific form of the second clamping structure 4 is not limited in the embodiments of the present disclosure.

For example, in the front frame assembly structure for the display device provided by the embodiments of the present disclosure, as shown in FIG. 5 and FIG. 6, the third sub-front frame 13 is clamped with the first sub-front frame 11 and the second sub-front frame 12 adjacent thereto through the first clamping structure 3, so as to limit the position of the third sub-front frame 13 in the second direction. The first clamping structure 3 limits the position of the third sub-front frame 13 in the second direction at both ends thereof. With respect to a large-screen display device, the front frame 1 usually has a relatively large size, and the third sub-front frame 13 usually has a relatively large length; in a case where the position of the third sub-front frame 13 is limited by the first clamping structure 3 at both ends, deformation may occur to a middle portion of the third sub-front frame 13, and the deformation in the middle portion of the third sub-front frame 13 may easily affect fixation of the optical components in the backplane 2 to a certain extent. For example, as shown in FIG. 4, the front wall of the third sub-front frame 13 is used to clamp and fix a liquid crystal glass screen of the display device, and if the deformation occurs to the middle portion of the third sub-front frame 13, the deformation may make fixation of the liquid crystal glass unstable, which is not favorable for improving quality of the display device.

In order to solve the problem of probable deformation in the middle portion of the third sub-front frame 13, as shown in FIG. 7, the middle portion of the third sub-front frame 13 and the backplane 2 are engaged with each other through a third clamping structure 5, and the third clamping structure 5 can limit relative movement between the middle portion of the third sub-front frame 13 and the backplane 2 in the second direction. For example, the middle portion of the third sub-front frame 13 and the backplane 2 may be engaged with each other through a plurality of third clamping structures 5. The middle portion of the third sub-front frame 13 refers to a region excluding both ends of the third sub-front frame 13. For example, the plurality of third clamping structures 5 may be evenly distributed in the region between both ends of the third sub-front frame 13. By providing the third clamping structure 5, relative movement between the middle portion of the third sub-front frame 13 and the backplane 2 in the second direction can be limited, that is, a position of the middle portion of the third sub-front frame 13 is limited, thereby avoiding deformation in the middle portion of the third sub-front frame 13, and avoiding influence of deformation in the middle portion of the third sub-front frame 13 on fixation of the optical components in the backplane 2, which is favorable for improving the quality of the display device.

Similar to the second clamping structure 4, the third clamping structure 5 is not unique. For example, as shown in FIG. 7, the third clamping structure 5 includes a second limit protrusion 51 provided on the backplane 2, for example, on the rear side surface of the backplane 2, and includes a second limit notch 52 provided on the third sub-front frame 13, for example, on the rear wall of the third sub-front frame 13. In a case where the edge of the backplane 2 is clamped into the groove 10 of the third sub-front frame 13, the second limit protrusion 51 extends into the second limit notch 52, and notch walls on both sides of the second limit notch 52 along the second direction both abut against the second limit protrusion 51. Because the notch walls on both sides of the second limit notch 52 along the second direction both abut against the second limit protrusion 51, relative movement between the third sub-front frame 13 and the backplane 2 in the second direction can be limited, that is, a position of the third sub-front frame 13 in the second direction is limited.

Of course, positions of the second limit protrusion 51 and the second limit notch 52 may also be exchanged, that is, the second limit notch 52 is opened on the backplane 2, for example, on the rear side surface of the backplane 2; and the second limit protrusion 51 is provided on the third sub-front frame 13, for example, on the rear wall of the third sub-front frame 13. In the case where the edge of the backplane 2 is clamped into the groove 10 of the third sub-front frame 13, the second limit protrusion 51 extends into the second limit notch 52, and notch walls on both sides of the second limit notch 52 along the second direction both abut against the second limit protrusion 51. In this way, the effect of limiting relative movement between the third sub-front frame 13 and the backplane 2 in the second direction can also be achieved.

For example, in an embodiment in which the second limit notch 52 is opened on the rear wall of the third sub-front frame 13 and the second limit protrusion 51 is provided on the rear side surface of the backplane 2, in order to conveniently implement engagement between the second limit protrusion 51 and the second limit notch 52 in the process of clamping the edge of the backplane 2 into the groove 10 of the third sub-front frame 13, as shown in FIG. 7, the second limit notch 52 includes a second limit slot section 521 and a second guide slot section 522; the second limit slot section 521 extends along the first direction; a first end of the second guide slot section 522 is connected with one end of the second limit slot section 521 that is close to the first sub-front frame 11; a second end of the second guide slot section 522 extends to a second edge 131 of the rear wall of the third sub-front frame 13, and the second edge 131 is an edge on one side of the rear wall of the third sub-front frame 13 that is close to a groove opening of the groove 10 of third sub-front frame 13. Because the second end of the second guide slot section 522 extends to the second edge 131 of the rear wall of the third sub-front frame 13, in the process of clamping the edge of the backplane 2 into the groove 10 of the third sub-front frame 13, the second limit protrusion 51 provided on the rear side surface of the backplane 2 can slide into the second limit slot section 521 along the second guide slot section 522 at the second edge 131 of the rear wall of the third sub-front frame 13, and then along the first direction, the third sub-front frame 13 is pushed toward a direction close to the first sub-front frame 11, so that the second limit protrusion 51 abuts against an end of the second limit slot section 521 that is away from the first sub-front frame 11, to finally limit a position of the middle portion of the third sub-front frame 13 in the second direction. By providing the second limit slot section 521 and the second guide slot section 522, interference between the second limit protrusion 51 and the edge of the backplane 2 can be avoided during the assembly process of the third sub-front frame 13 and the backplane 2, so that the assembly of the second sub-front frame 12 and the backplane 2 is more convenient and smooth.

It should be noted that, as shown in FIG. 7, the reason why the first end of the second guide slot section 522 is connected with the end of the second limit slot section 521 that is close to the first sub-front frame 11 is that, during the assembly process of the third sub-front frame 13 and the backplane 2, one end of the third sub-front frame 13 needs to abut against the first sub-front frame 11, and in order to implement abutting, the third sub-front frame 13 needs to move relative to the backplane 2 toward the direction close to the first sub-front frame 11, and the first end of the second guide slot section 522 being connected with the end of the second limit slot section 521 that is close to the first sub-front frame 11 is exactly for the sake that the third sub-front frame 13 can move along the second limit slot section 521 toward the direction close to the first sub-front frame 11.

For example, in an embodiment in which the second limit notch 52 is opened on the rear side surface of the backplane 2, and the second limit protrusion 51 is provided on the rear wall of the third sub-front frame 13, in order to conveniently implement engagement between the second limit protrusion 51 and the second limit notch 52 in a process of clamping the edge of the backplane 2 into the groove 10 of the third sub-front frame 13, the second limit notch 52 includes a second limit slot section 521 and a second guide slot section 522; the second limit slot section 521 extends in the first direction; a first end of the second guide slot section 522 is connected with an end of the second limit slot section 521 that is away from or close to the first sub-front frame 11; and a second end of the second guide slot section 522 extends to an edge of the rear side surface of the backplane 2. In this embodiment, beneficial effects obtained by providing the second limit slot section 521 and the second guide slot section 522 are the same as those in the embodiment in which the second limit notch 52 is opened on the rear wall of the third sub-front frame 13, and no details will be repeated here.

Figure 9:
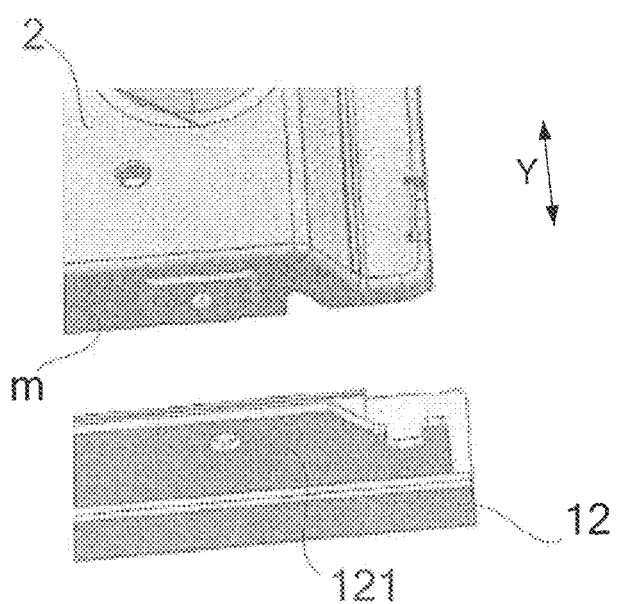
FIG. 9 is an exploded view of a second sub-front frame and a backplane provided by at least one embodiment of the present disclosure.

In the display device provided by the embodiments of the present disclosure, a mode of fixing the second sub-front frame 12 and the backplane 2 is not unique, for example, the second sub-front frame 12 may be fixed in a mode below: as shown in FIG. 9, the second sub-front frame 12 includes a mounting plate 121, and the mounting plate 121 is fixedly connected with a surface of the backplane 2 that is perpendicular to the first direction (e.g., an m surface in FIG. 9). For example, the mounting plate 121 is fixedly connected with the surface of the backplane 2 that is perpendicular to the first direction (e.g., the m surface in FIG. 9) by a threaded fastener (e.g., a common screw). In addition, the second sub-front frame 12 may also be fixed in a mode below: the second sub-front frame 12 has a groove 10, the edge of the backplane 2 is clamped into the groove 10 of the second sub-front frame 12, and the rear wall of the second sub-front frame 12 is fixedly connected with the backplane 2 by a threaded fastener. As compared with a living mode in which the rear wall of the second sub-front frame 12 is fixedly connected with the backplane 2 by a threaded fastener, in the fixing mode shown in FIG. 9, the mounting plate 121 is fixedly connected with the surface of the backplane 2 that is perpendicular to the first direction (i.e., a side surface of the backplane 2) by a threaded fastener, the operator can directly connect the second sub-front frame 12 with the backplane 2 by the threaded fastener without turning the display device 180 degrees; in this way, the optical components inside the backplane 2 may be prevented from being misaligned during a turning process, so that assembling quality of the display device can be ensured, which is further favorable for improving the quality of the display device.

It should be noted that, during the assembly process for the display device, the display device is usually placed with a display screen facing up; if the rear wall of the front frame 1 needs to be connected with the backplane 2 by screws, because the rear wall of the front frame 1 is located below, it is inconvenient to mount the screws, in this situation, the display device is turned 180 degrees so that the rear wall of the front frame 1 is located above; however, turning the display device 180 degrees will bring a risk of component misalignment.

In a second aspect, an embodiment of the present disclosure provides a display device, the display device comprises the front frame assembly structure according to any one of the above embodiments.

For example, the display device may be a liquid crystal television, a computer monitor, a mobile phone, and any other device having a structure of a front frame and a backplane.

Because the front frame assembly structure comprised in the display device provided by the embodiments of the present disclosure is the same as any one of the above-described front frame assembly structures, the same technical problems can be solved, and the same technical effects can be achieved.

As for other structures of the display device, these are well known to those skilled in the art, and no details will be repeated here.

In the front frame assembly structure for the display device and the display device provided by the embodiments of the present disclosure, the first sub-front frame and the two third sub-front frames are all relatively fixed to the backplane by clamping or abutting, in this way, during assembling, the first sub-front frame and the two third sub-front frames are connected with the backplane without any screw, and the assembly may be completed directly by simple clamping or abutting, so that an operator does not have to tighten the screws one by one, thereby saving a lot of time and labor for assembly, which is favorable for improving assembly efficiency and reducing labor costs; in addition, because the first sub-front frame and the two third sub-front frames are connected with the backplane without any screw, it is not necessary to provide any threaded column inside the backplane, which can greatly reduce occupation of internal space of the backplane, and can facilitate optimal arrangements of internal components of the backplane; and meanwhile, because the first sub-front frame and the two third sub-front frames are connected with the backplane without any screw, apparent aesthetic sense for the display device is also increased.

The following several statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness of a layer or area may be enlarged or narrowed, that is, the drawings are not drawn in a real scale. However, it should be understood that, in the case a component or element such as a layer, a film, an area, a substrate, or the like is referred to be "on" or "under" another component or element, the component or element may be "directly" "on" or "under" the another component or element, or a component or element may be interposed therebetween.

(3) In case of no conflict, features the embodiments of the present disclosure and features in the embodiments can be combined to obtain new embodiments.

What have been described above are only specific implementations of the present disclosure, the protection scope of the present disclosure is not limited thereto. The protection scope of the present disclosure should be based on the protection scope of the claims.

The invention claimed is:

1. A front frame assembly structure for a display device, comprising a front frame and a backplane, the front frame comprising four sub-front frames, the four sub-front frames being: a first sub-front frame and a second sub-front frame that are arranged along a first direction, and two third sub-front frames arranged along a second direction, respectively, and the second direction being perpendicular to the first direction, wherein the first sub-front frame and the two third sub-front frames each have a groove; an edge of the backplane is capable of being clamped into the groove of the first sub-front frame and the grooves of the two sub-front frames; the second sub-front frame is connected with the backplane; adjacent two of the sub-front frames are engaged with each other through a first clamping structure, and the first clamping structure is configured to limit relative movement between the adjacent two of the sub-front frames at least in the second direction;

two side walls of the groove of each of the first sub-front frame and the two third sub-front frames are arranged along a third direction, the edge of the backplane is clamped between the two side walls in the third direction, and the third direction is perpendicular to the first direction and the second direction;

the backplane and a middle portion of the third sub front frame are engaged with each other through a third clamping structure, and the third clamping structure is configured to limit relative movement between the middle portion of the third sub-front frame and the backplane in the second direction.

2. The front frame assembly structure for the display device according to claim 1, wherein the first sub-front frame and the backplane are engaged with each other through a second clamping structure; and the second clamping structure is configured to limit relative movement between the first sub-front frame and the backplane at least in the first direction.

3. The front frame assembly structure for the display device according to claim 2, wherein both ends of the third sub-front frame respectively abut against the first sub-front frame and the second sub-front frame, so as to limit movement of the third sub-front frame relative to the first sub-front frame and the second sub-front frame in the first direction.

4. The front frame assembly structure for the display device according to claim 3, wherein the first clamping structure comprises a first clamping claw provided on one of the adjacent two of the sub-front frames, and a first clamp notch provided on the other of the adjacent two of the sub-front frames, and the first clamping claw is capable of extending into the first clamp notch.

5. The front frame assembly structure for the display device according to claim 4, wherein notch walls on both sides of the first clamp notch that are arranged along the second direction both abut against the first clamping claw.

6. The front frame assembly structure for the display device according to claim 3, wherein, with respect to the first clamping structure connected with the first sub-front frame and the third sub-front frame, the first clamping claw is provided on a rear wall of one of the adjacent two of the sub-front frames, and the first clamp notch is provided on a rear wall of the other of the adjacent two of the sub-front frames;

a rear wall of the sub-front frame is farther away from a display side of the display device than a front wall of the sub-front frame.

7. The front frame assembly structure for the display device according to claim 3, wherein the second clamping structure comprises a first limit protrusion provided on the backplane and a first limit notch provided on the first sub-front frame, or the second clamping structure comprises a first limit notch provided on the backplane and a first limit protrusion provided on the first sub-front frame; and wherein in a case where the edge of the backplane is clamped into the groove of the first sub-front frame, the first limit protrusion extends into the first limit notch.

8. The front frame assembly structure for the display device according to claim 7, wherein notch walls on both sides of the first limit notch that are arranged along the first direction both abut against the first limit protrusion.

9. The front frame assembly structure for the display device according to claim 7, wherein the first limit protrusion is provided on a rear side surface of the backplane, and the first limit notch is provided on a rear wall of the first sub-front frame, or the first limit protrusion is provided on the rear wall of the first sub-front frame, and the first limit notch is provided on the rear side surface of the backplane; and the rear wall of the first sub-front frame is farther away from a display side of the display device than a front wall of the first sub-front frame, and the rear side surface of the backplane is farther away from the display side of the display device than a front side surface of the backplane.

10. The front frame assembly structure for the display device according to claim 9, wherein the first limit notch comprises a first limit slot section and a first guide slot section; the first limit slot section extends along the second direction; a first end of the first guide slot section is connected with one end of the first limit slot section;

in a case where the first limit notch is provided on the rear wall of the first sub-front frame, a second end of the first guide slot section extends to a first edge of the rear wall of the first sub-front frame, and the first edge is an edge on one side of the rear wall of the first sub-front frame that is close to a groove opening of the groove of the first sub-front frame; and in a case where the first limit notch is provided on the rear side surface of the backplane, the second end of the first guide slot section extends to an edge of the rear side surface of the backplane.

11. The front frame assembly structure for the display device according to claim 1, wherein the third clamping structure comprises a second limit protrusion provided on the backplane and a second limit notch provided on the third sub-front frame, or the third clamping structure comprises a second limit notch provided on the backplane and a second limit protrusion provided on the third sub-front frame; and wherein in a case where the edge of the backplane is clamped into the groove of the third sub-front frame, the second limit protrusion extends into the second limit notch.

12. The front frame assembly structure for the display device according to claim 11, wherein notch walls on both sides of the second limit notch that are arranged along the second direction both abut against the second limit protrusion.

13. The front frame assembly structure for the display device according to claim 11, wherein the second limit protrusion is provided on the rear side surface of the backplane, and the second limit notch is provided on a rear wall of the third sub-front frame, or the second limit protrusion is provided on the rear wall of the third sub-front frame, and the second limit notch is provided on the rear side surface of the backplane; and the rear wall of the third sub-front frame is farther away from the display side of the display device than a front wall of the third sub-front frame, and the rear side surface of the backplane is farther away from the display side of the display device than a front side surface of the backplane.

14. The front frame assembly structure for the display device according to claim 13, wherein the second limit notch comprises a second limit slot section and a second guide slot section, and the second limit slot section extends along the first direction;

in a case where the second limit notch is provided on the rear wall of the third sub-front frame, a first end of the second guide slot section is connected with an end of the second limit slot section that is close to the first sub-front frame; a second end of the second guide slot section extends to a second edge of the rear wall of the third sub-front frame; and the second edge is an edge on one side of the rear wall of the third sub-front frame that is close to the groove opening of the groove of the third sub-front frame; and in a case where the second limit notch is provided on the rear side surface of the backplane, the first end of the second guide slot section is connected with the end of the second limit slot section that is close to the first sub-front frame, and the second end of the second guide slot section extends to the edge of the rear side surface of the backplane.

15. The front frame assembly structure for the display device according to claim 1, wherein the front frame assembly structure comprises a plurality of third clamping structures, and the backplane and the middle portion of the third sub-front frame are engaged with each other through the plurality of third damping structures.

16. The front frame assembly structure for the display device according to claim 1, wherein the second front frame comprises a mounting plate, and the mounting plate is fixedly connected with a side surface of the backplane that is perpendicular to the first direction.

17. The front frame assembly structure for the display device according to claim 16, wherein the mounting plate is fixedly connected with the side surface of the backplane that is perpendicular to the first direction by a threaded fastener.

18. A display device, comprising the front frame assembly structure according to claim 1.

* * * * *